United States Patent [19]

Warnock

[11] 4,038,461
[45] July 26, 1977

[54] ELECTROCHEMICAL CELL HAVING BALANCED DISTRIBUTION OF OXYGEN AND ELECTROLYTE

[75] Inventor: Don R. Warnock, Centerville, Ohio

[73] Assignee: The United States of America as represented by the Secretary of the Air Force, Washington, D.C.

[21] Appl. No.: 652,954

[22] Filed: Jan. 28, 1976

[51] Int. Cl.$^2$ .............................................. H01M 8/04
[52] U.S. Cl. ......................................... 429/21; 429/34
[58] Field of Search ..................... 429/21, 34, 101, 223

[56] References Cited

U.S. PATENT DOCUMENTS

| 3,850,694 | 11/1974 | Dunlop | 429/21 |
| 3,867,199 | 2/1975 | Dunlop | 429/101 |
| 3,981,745 | 9/1976 | Stedman | 429/21 X |

Primary Examiner—Anthony Skapars
Assistant Examiner—H. A. Feeley

Attorney, Agent, or Firm—Joseph E. Rusz; Robert Kern Duncan

[57] ABSTRACT

An improved electrochemical cell having circular anodes, cathodes, and electrolyte reservoirs; semicircular separators and gas flow spaces, is constructed such that approximately one-half of each of the two major faces of each cathode is adjacent to separator material, and the other half of each major face is adjacent to a gas flow space such that the area on each cathode major face adjacent to separator material is opposite (through the cathode) the area of the other major face which is adjacent to a gas flow space. Approximately one-half of each of the two major faces of each anode is also positioned adjacent to separator material and the other half of each major anode face is adjacent to a gas flow space. In the fabricated stack each separator has an adjacent anode face and an adjacent cathode face opposite each other across the separator. Electrolyte reservoirs are positioned adjacent anodes at the top and bottom ends of the stack.

4 Claims, 5 Drawing Figures

ELECTROCHEMICAL CELL HAVING BALANCED DISTRIBUTION OF OXYGEN AND ELECTROLYTE

RIGHTS OF THE GOVERNMENT

The invention described herein may be manufactured and used by or for the Government of the United States for all governmental purposes without the payment of any royalty.

BACKGROUND OF THE INVENTION

The field of the invention is in metal-gas and metal-metal secondary electrochemical energy storage cells and more particularly in the arrangement of the elements of such cells.

In many secondary electrochemical energy storage cells oxygen is evolved from the cathode during overcharge and to a lesser extent, during charge of the cells. Examples of such cells are nickel-hydrogen cells, nickel-cadmium cells, silver-hydrogen cells, silver-zinc cells and silver-cadmium cells.

The evolution of oxygen can produce undesirable effects within the cells and can impose undesirable constraints on the design and operation of the cells. Since no effective method has been found to completely eliminate the evolution of oxygen, various means of recombining it with minimal disruption of cell design and operation have been sought. These means typically involve transport of the oxygen from the cathode to a place where it can be chemically recombined.

Examples of undesirable effects of oxygen evolution are given here for nickel-hydrogen cells as an example of the class of metal-gas cells, and for nickel-cadmium cells as an example of the class of metal-metal cells, where the terms metal-gas and metal-metal refer to the nature of the cathode-anode couples of the cell. Similar effects apply to other members of these classes.

Examples of undesirable effects of oxygen evolution in nickel-hydrogen cells include: (1) melting of separators made of nylon or polypropylene as a result of locally excessive heat released when evolved oxygen gas passes through the separator and recombines with hydrogen at the anode; (2) expulsion or entrainment of electrolyte from the cathode as a result of oxygen gas bubbles moving through or out of the cathode; (3) maldistribution of water in the electrolyte as a result of local imbalances in the hydrogen-oxygen recombination rates; and (4) maldistribution of heat production as a result of local imbalances in the hydrogen-oxygen recombination rates.

An example of an undesirable effect of oxygen evolution in nickel-cadmium cells is the excessive cell pressure rise which results if the oxygen cannot be chemically recombined at an adequate rate.

Accommodation of these undesirable effects imposes undesirable constraints on the design and operation of the cells. For example, nickel-hydrogen cells should not use nylon or polypropylene separators in applications where oxygen evolution rates are sufficient to cause melting of those separators. Nickel-cadmium cells must be carefully controlled to prevent overcharge for very long at rates which will cause oxygen to be evolved faster than it can be recombined.

Typical structures in the prior art that are of interest are disclosed in U.S. Pat. No. 3,669,744 to patentees B. I. Tsenter et al, U.S. Pat. No. 3,826,684 to patentee S. F. Pensabene, U.S. Pat. No. 3,850,694 to patentees J. D. Dunlop et al, and U.S. Pat. No. 3,867,199 to J. D. Dunlop et al.

SUMMARY OF THE INVENTION

The present invention provides an arrangement of cell components which promotes ease and uniformity in the recombination of evolved oxygen, and which thereby minimizes or eliminates many of the previously mentioned undesirable concomitants of conventional cell design. It also provides a structural arrangement that retains and distributes electrolyte within the cell component stack in an improved manner. The structural arrangement as disclosed herein provides greater freedom for the cell designer in the selection of separator materials and permeability characteristics. Relatively permeable separators of nylon and polypropylene may now be safely used because the invention provides an alternate path for evolved oxygen (other than through the separator). The resultant reduction in the amount of oxygen which must go through such separators may be sufficient to allow their use without creating recombination heating that will damage the separators or anodes. Relatively impermeable separators such as asbestos and potassium-titanate may be used without creating oxygen pressure forces which tend to force oxygen and electrolyte radially out of the cell stack.

The maldistribution of waste heat and product water resulting from the hydrogen-oxygen recombination reaction prevalent in the prior art cells is greatly reduced or eliminated.

In the disclosed cell structures there are no net forces tending to create maldistribution of electrolyte in the cell stack, because for each cathode-anode pair the sources of electrolyte depletion (entrainment to another pair) are balanced by sources of electrolyte replenishment (entrainment from another pair).

Also, there are no net forces tending to create electrolyte concentration differences between different cathode-anode pairs in the cell stack, because for each cathode-anode pair the sources of electrolyte dilution (product water from the hydrogen-oxygen recombination reaction) are equal. There will be a concentration gradient from cathode to anode in each cathode-anode pair but this gradient will be essentially equal for each cathode-anode pair in the cell stack.

DESCRIPTION OF THE PREFERRED EMBODIMENT

In the discussion which follows, examples appropriate to nickel-hydrogen cell technology will be cited and a specific embodiment will be described. It should be recognized, however, that the disclosed arrangement described here is not limited to nickel-hydrogen cell technology; and that persons skilled in the art of electrochemical energy storage cell design can easily adapt the principle of cell arrangement of this invention to other cell technologies, some of which have previously been mentioned, without deviating from the scope of the claimed invention. The convention in which the anode is the electrode of negative electrical polarity during discharge and the cathode is the electrode of positive electrical polarity during discharge will be used.

Figure 1:
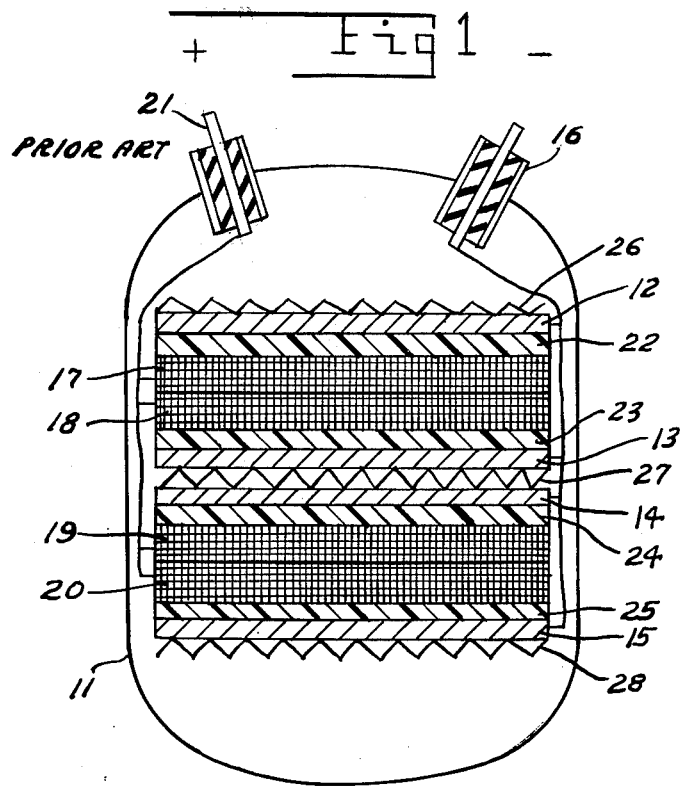
FIG. 1 is a schematic-pictorial representation of a typical prior art nickel-hydrogen cell stack.

The improvements offered by the present invention can best be understood by a comparison with conventional designs currently known and used in the art. FIG. 1 represents such a conventional design of a nickel-hydrogen cell. It is comprised of a stack of essentially disc-shaped components arranged along a common axis and mounted in a cylindrical metal pressure vessel 11 having hemispherical end caps. The anodes 12, 13, 14, and 15 are connected electrically in parallel to the negative terminal 16 and the cathodes 17, 18, 19, and 20 are connected electrically in parallel to the positive terminal 21. Separators 22, 23, 24, and 25 are disposed between the anodes and cathodes and gas flow spaces 26, 27, 28 are adjacent to the anodes. The cell stack is partly saturated with an aqueous solution of potassium-hydroxide electrolyte except for the gas flow spaces and the large pores of the anodes. The pressure vessel is filled with hydrogen gas whose pressure will typically vary between 500 psi and 100 psi during cyclic charge-discharge operation. This general type of cell arrangement for nickel-hydrogen cells is widely known in the art.

In some conventional cells of general arrangement, as illustrated in FIG. 1, the separators 22-25 are made of non-woven organic fibers such as nylon or polypropylene. These separators may be described as being relatively permeable (i.e., relative to the oxygen transport needs of the cell) to transport through the separator of oxygen evolved from the cathode. Unfortunately, the oxygen thus transported through the separator is not evenly distributed across the surface of the separator; but is instead "channeled" or "bubbled" through the separator preferentially at "weak" points in the separator caused by a local deficiency of electrolyte or by a locally reduced bubble breakthrough pressure due to a local deficiency of electrolyte or to the size, number density, configuration or wettability characteristics of the organic fibers which make up the separator. Oxygen transported through the separator to the anode will rapidly recombine with the hydrogen gas available there in the presence of the catalysts commonly used in the anodes of metal-gas cells. This reaction produces water, which becomes part of the aqueous electrolyte, and considerable waste heat. When the oxygen is channeled or bubbled through the separator in locally large amounts a locally greater production of water and waste heat occurs. This locally high production of waste heat can cause melting and burning of organic fiber separators. This creates progressively larger holes in the separator until the separator and the cell fail.

In conventional cells having organic fiber separators, the separator represents the path of least resistance for the transport of oxygen generated at the cathodes. The only alternate path being the relatively long and tortuous radial path through or along the surfaces of the cathodes to their perimeter, into the hydrogen gas gap, around the perimeter of the separators, and back in through the perimeter of the gas flow spaces to the surface of the anodes.

In other conventional cells of the general arrangement shown in FIG. 1, the separators 22-25 are made of inorganic fibers such as potassium titanate or asbestos. These separators, when wet with electrolyte, may be described as being relatively impermeable to the transport of oxygen and the alternate path described in the preceding paragraph may become the path of least resistance to such transport. Separators of this type are not susceptible to melting or burning because of their higher temperature resistance and because they do not transport locally large amounts of oxygen.

Although relatively impermeable separators solve the problem of separator failure due to melting or burning, they create problems related to movement of oxygen along the alternate path described above and they typically provide lower voltage performance (efficiency). There are two main problems associated with the alternate path: (1) loss of electrolyte from the cell stack and (2) uneven production of water and waste heat from the hydrogen-oxygen recombination reaction. Loss of electrolyte occurs by expulsion, as oxygen bubbles form in a cathode and move to its perimeter pushing electrolyte in front of them through channels in or between the cathodes; or by entrainment, as the bubbles break at the perimeter of the cathode to release oxygen and a fine mist of entrained electrolyte to the hydrogen gas gap. Uneven production of water and waste heat occurs on the anode and results from more oxygen recombining with hydrogen near the perimeter of the anode, where it enters the heat occurs on the anode and results from more oxygen combining with hydrogen near the perimeter of the anode, where it enters the gas flow space from the hydrogen gas gap, than near the center of gas gap, than near the center of the anode which is less accessible. Both of these problems can lead to degradation of performance and failure of nickel-hydrogen cells. Loss of electrolyte results in progressive reduction of accessible electrode active material and of the ion conducting pathway between anode and cathode. Uneven production of water and waste heat results, respectively, in transverse electrolyte concentration gradients and temperature gradients. Transverse electrolyte gradients can cause transverse current density gradients and related imbalances in cell operation which degrade performance and life. Excess water and heat production at the outer perimeter of the anode exacerbates the problem of water vapor transfer from the cell stack to the inner surface of the pressure vessel. This occurs because the excess water increases the water vapor pressure and the temperature of the electrolyte at the perimeter of the anode both of which are driving forces for water vapor transfer to, and condensation on, the cooler surfaces of the pressure vessel.

At least three major approaches to the oxygen transport problem have been attempted. Although the following description is not an exhaustive exposition of these approaches, it is sufficient to show the important elements. The first approach suggests the use of separators made of heat resistant materials which have carefully controlled permeability so that the necessary oxygen transport is achieved through the separator, but never in locally excessive amounts. Since such separators have not as yet been successfully developed or demonstrated for nickel-hydrogen cells, this approach requires future development and demonstration in order to determine its practical feasibility.

The second approach involves transporting oxygen radially outward through or along the surfaces of the cathodes and around the perimeter of an oxygen impermeable separator as previously described. The stack is then either wrapped around its circumference with a porous hydrophobic membrane, which allows gas flow in and out of the stack while retaining liquid electrolyte within the stack; or it is wrapped with a porous hydrophilic wick material which allows gas flow and returns any electrolyte which has been forced from the stack. This approach accepts the undesirable effects of uneven production of water and waste heat on the anode and places the major burden for electrolyte management in the cell on the membrane or wick.

Figure 5:
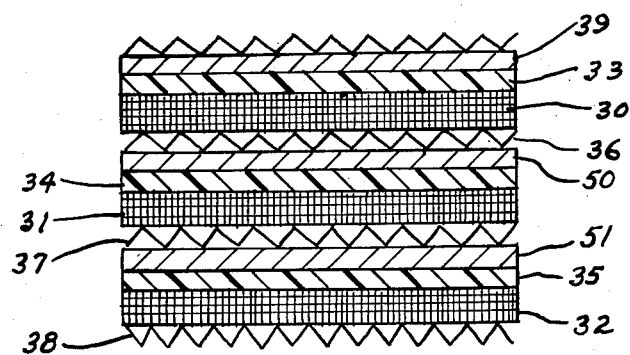
FIG. 5 is a schematic-pictorial representation of an interim structure illustrative of cell operation.

A third approach is to use the stacking arrangement shown in FIG. 5. In this arrangement, oxygen evolved from the cathode 30, 31, and 32 does not have to go through the separator 33, 34, and 35, but instead is evolved directly into the adjacent hydrogen flow space 36, 37, and 38. From the surface of the cathodes 30 and 31 facing the gas flow spaces 36 and 37, oxygen molecules can interdiffuse with the hydrogen gas and recombine evenly across the surface of the anodes 50 and 51. Such diffused recombination will eliminate the local hot spots resulting from locally concentrated amounts of oxygen gas coming in contact with the anode. This evenly distributed recombination also eliminates the maldistribution of waste heat release and water production associated with the second approach described above. This approach also reduces loss of electrolyte by expulsion or entrainment because the evolving oxygen does not have to push radially outward through or along the surfaces of the cathodes to the hydrogen gas gap. Loss by entrainment is also reduced because the oxygen is evolved over a much larger area of the cathode (the flat face rather than the thin perimeter) and therefore will have a much lower velocity than when the same amount of oxygen must be evolved through the much smaller area at the perimeter of the cathode. Furthermore, any electrolyte lost by entrainment from one cathode is carried directly across the gas flow space to an adjacent anode and thus is not lost from the cell stack.

The problem with this third approach to solving the oxygen transport problem occurs at the ends of the stack. In order to maintain a proper distribution and concentration of electrolyte throughout the cell stack, oxygen evolved at the last cathode 32 in the stack (i.e., the last cathode in the direction in which oxygen is evolved from cathode to gas flow space) should recombine with hydrogen at the anode 39 at the other end of the stack. Also, any electrolyte expelled or entrained from the last cathode should be transported to the anode at the other end of the stack to make up for electrolyte being lost there by the same expulsion or entrainment processes. The end of the stack from which oxygen and electrolyte are lost from the last cathode and not locally recovered by an adjacent anode may be referred to as the oxygen surplus end of the stack. The other end of the stack may be referred to as the oxygen deficient end.

The inability to achieve the required transport of oxygen and electrolyte from the oxygen surplus end of the stack to the oxygen deficient end is undoubtedly partly responsible for the general lack of interest in this third approach by those practicing in the art in spite of its other attractive features. For example, if one attempts to transport oxygen from the surplus end to the deficient end by diffusion of oxygen through the hydrogen gap, there is little hope that much oxygen will reach the deficient end. This is true because any oxygen diffusing through the hydrogen gap can enter the stack at any gas flow space along the periphery of the cell stack and recombine at the adjacent anode. Since in order to diffuse from one end of the stack to the other there must be an oxygen concentration gradient in the hydrogen gap from the oxygen surplus end to the oxygen deficient end, most of the oxygen can be expected to recombine on anodes near the oxygen surplus end of the stack. In addition to failing to alleviate the oxygen deficiency at the other end of the stack, this also unbalances the heat and water production in the stack, which balance is an objective of the approach.

There have recently been considerations in utilizing the third approach to employ a tube to transport oxygen from the surplus end to the deficient end. Presumably the tube must channel all oxygen evolved at the last cathode at the oxygen surplus end of the stack to the first anode at the oxygen deficient end of the stack in order to avoid the problems of oxygen diffusion via the hydrogen gap. Use of a tube in this way is potentially dangerous for the following reasons. The oxygen concentration in hydrogen must be kept below about 6% in order to avoid the explosive limit at about 6%. If oxygen is constrained to flow in a tube of too limited volume, the oxygen concentration can rise above the explosive limit and an explosion can occur when the mixture of oxygen and hydrogen recombine on the anode catalyst at the oxygen deficient end of the stack.

From the standpoint of exceeding the explosive limit there is a different between the conditions which exist in the gas flow spaces in the cell stack and in a tube between the ends of the stack. In a gas flow space, oxygen evolution is distributed over the exposed area of the cathode surface and it has a short diffusion path to the anode surface where it can recombine with hydrogen. Under these conditions, the oxygen diffusion path is wide and short and the average dwell time for evolved oxygen molecules in the gas flow space is short prior to recombination. Other factors being equal, the oxygen concentration in either volume (gas flow space or tube) will tend to be inversely proportional to volume and proportional to dwell time. This indicates relatively higher oxygen concentration in a tube compared to a gas flow space when the product of the dwell time and the inverse of the volume for the tube exceeds the corresponding product for the gas flow space; a situation that is likely to exist considering conventional nickel-hydrogen cell geometries and the limited space available for providing a tube of large cross-sectional area between the ends of the cell stack.

In this tube approach, it is necessary to seal the tube volume into which the oxygen evolves on the oxygen surplus end of the stack from the bulk hydrogen storage volume there in order to prevent escape of oxygen to that volume. This requirement results from the fact that any oxygen escaping to the bulk hydrogen storage volume is more likely to recombine on anodes other than the one desired as previously described. The manifold cannot be sealed from the bulk hydrogen storage volume in the vicinity of the anode at the oxygen deficient end of the stack because that anode must have access to hydrogen gas in order to operate. The configuration requirements of the tube are therefore: (1) a good seal at the oxygen surplus end of the stack; (2) adequate internal volume for hydrogen so that the oxygen concentration does not exceed the explosive limit at about 6% oxygen in hydrogen; and (3) a closely conforming, but not sealed, cover over the oxygen deficient end of the stack to allow hydrogen access but prevent undue oxygen loss to the bulk hydrogen storage volume. At the present state of the art, these requirements have not been satisfactorily met. The tube does not provide for transport of electrolyte.

Figure 2:
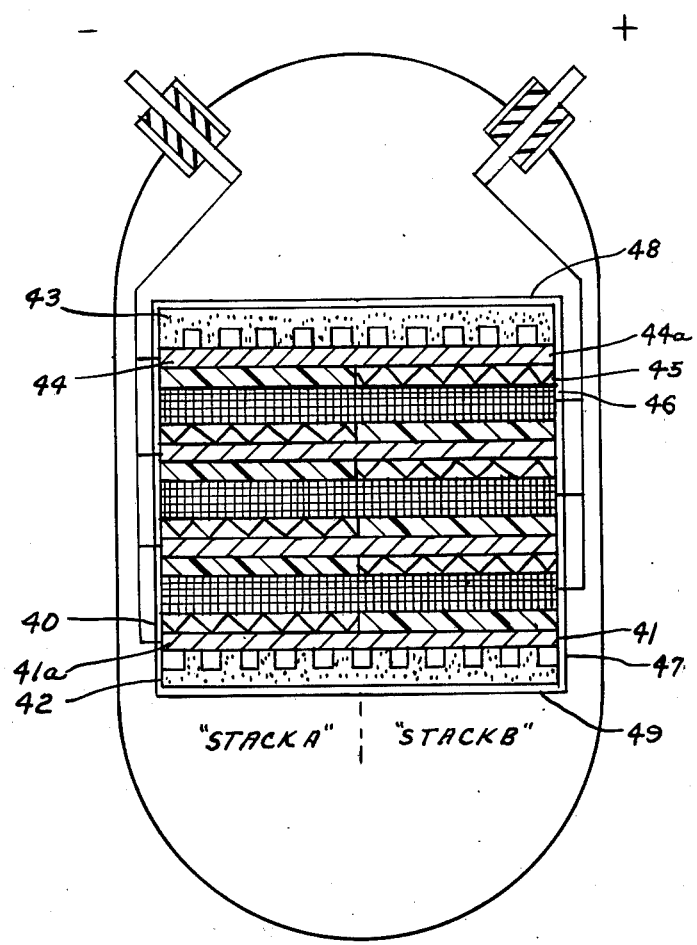
FIG. 2 is a schematic-pictorial representation of an arrangement of cell structure in a typical embodiment of the invention.

The present invention provides a cell stack component arrangement as illustrated by the embodiment shown in FIG. 2. This arrangement has the advantages attributed to the third approach previously described, but without incurring the difficulties of that approach in returning oxygen and electrolyte from the oxygen surplus end of the stack to the oxygen deficient end of the stack.

For purposes of explanation, temporarily consider only the left half of the cell component stack shown in FIG. 2 and call that half "Stack A". Stack A has the same component arrangement as shown in FIG. 5 except for the gas flow space 40 and aode 41a at the bottom of that stack and the electrolyte reservoirs 42 and 43 at both ends of the stack. However, instead of the elements of the cell being flat circular disc-shaped elements, they would in this imaginary stack all be half disc-shaped elements. (The view of FIG. 2 of the drawing may also be considered to represent a half section through the center of the discs and half discs.) For Stack A the oxygen surplus end of the stack is at the bottom and the oxygen deficient end is at the top. Now, temporarily consider only the right half of the stack shown in FIG. 2 and call that half "Stack B". Stack B is identical to Stack A except that it is oriented so that its oxygen surplus end is at the top and adjacent to the oxygen deficient end of Stack A, and its oxygen deficient end is at the bottom and adjacent to the oxygen surplus end of Stack A. Note that the anode 44 at the top of Stack A is extended to the right, 44a, and a gas flow space 45 is placed beneath this extended portion as shown. With this arrangement, oxygen and electrolyte moving upward from the cathode 46 at the top of stack B will tend to be collected by the extended part 44a of anode 44 of Stack A just as oxygen and electrolyte moving upward from any other cathode in Stack B will tend to be collected by the adjacent anode.

Oxygen which recombines on the extended anode 44a of Stack A produces water which dilutes electrolyte in that anode and in the adjacent electrolyte reservoir 43, and which will be transported through those structures to the oxygen deficient end of Stack A. Electrolyte striking the extended anode of Stack A will also be transported through the extended anode and reservoir to the oxygen deficient end of Stack A. Similar reasoning applies to the bottom of the stack where the anode 41 at the bottom of Stack B is extended to the left, 41a, to capture oxygen and electrolyte from the oxygen surplus end of Stack A and transport them to the oxygen deficient end of Stack B.

The cell component stack of FIG. 2 can now be considered as a single stack of components, as shown, in which evolved oxygen and expelled or entrained electrolyte tend to move down the left side of the stack, from left to right through the extended anode and reservoir at the bottom of the stack, up through the right side of the stack, and from right to left through the extended anode and reservoir at the top of the stack. In this manner aa closed circuit for recirculation of evolved oxygen and expelled or entrained electrolyte is provided wholly within the geometric envelope of the cell stack.

On occasion in the electrochemical art, reference is made to a cathode-anode pair, plate-pair, couple, or other term signifying that two electrodes are paired together with a separator interposed between them to work as an electrochemical unit. In the present invention such terminology cannot be applied to the cathodes and anodes in the conventional manner because of the location of the separator on opposite faces of the cathode and anode structures on opposite ends of those structures. In the present invention the cathodes and anodes are considered paired in the conventional sense only over their areas which are shared with a common separator.

Although the cell stack component arrangement shown in FIG. 2 minimizes forces tending to force oxygen and electrolyte radially out of the stack, some electrolyte could escape from the outer perimeter of the gas flow spaces over a long period of time unless an electrolyte entrainment barrier 47 is used. This barrier may be made of a porous hydrophobic plastic membrane, such as porous Teflon, which encloses the cell stack around its circumference and, if desired, around its top and bottom 48 and 49 as well. This membrane is designed to prevent movement of liquid electrolyte through the membrane and out of the stack, while allowing free movement of gases though the membrane between the gas flow spaces and the hydrogen gas gap.

The relatively small amount of oxygen which diffuses from the gas flow spaces through the membrane to the hydrogen gap and bulk hydrogen storage volumes will initially establish a low ($\sim 1\%$) concentration of oxygen in hydrogen throughout the cell. Following establishment of this quasi-equilibrium condition, back diffusion of oxygen into the gas flow spaces will, on average, equal diffusion of oxygen out of the gas flow spaces except for minor fluctuations of the equilibrium concentration value as a result of changes in oxygen evolution rate. Under these circumstances, differences in oxygen recombination on different anodes will be negligible.

Figure 3:
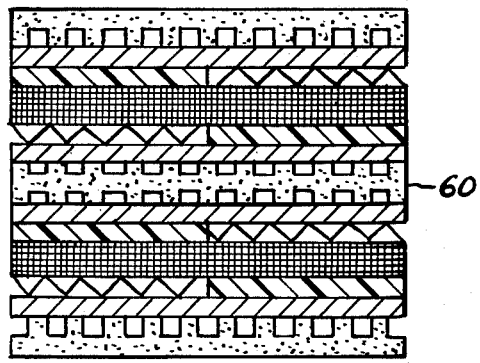
FIG. 3 is a schematic-pictorial representation of an alternate arrangement of cell structure of another embodiment of the invention.

FIG. 3 illustrates an alternate arrangement of elements in which electrolyte reservoirs 60 are placed between pairs of anodes. The electrolyte reservoirs may be made of metallized molded porous polysulfone or, more simply, of fibrous sheets of nylon or polypropylene such as are used as battery separators. In cells having long stacks with a large number of elements this construction with additional reservoirs is generally desirable. The previously mentioned recirculation of oxygen and electrolyte takes place between the adjacent reservoirs.

Figure 4:
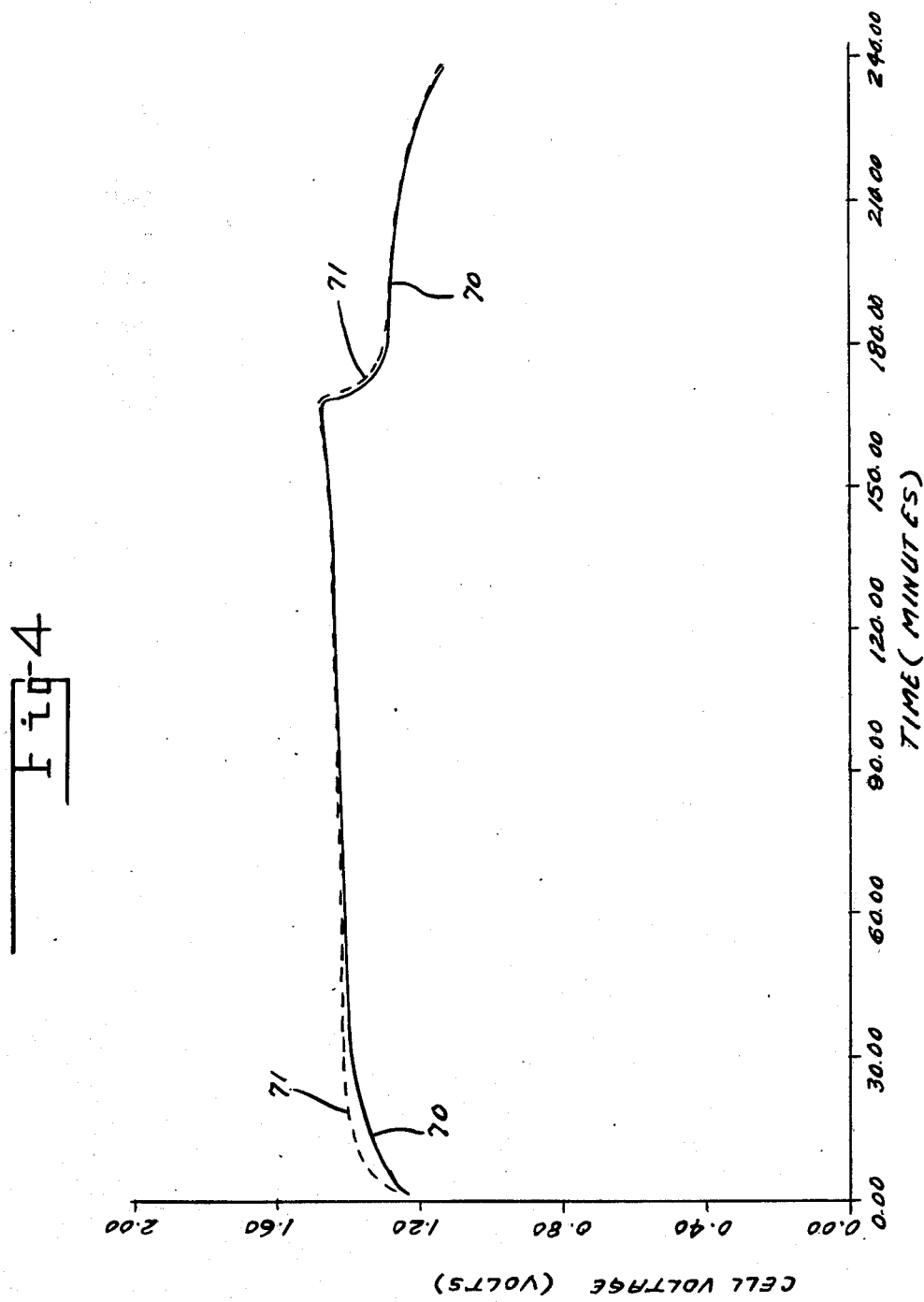
FIG. 4 is a representative plot of the charge and discharge characteristics of a typical embodiment of the invention after 100 and after 500 cycles of charge and discharge.

FIG. 4 illustrates the charge-discharge characteristics of a typical embodiment of the invention in a nickel-hydrogen cell after 100 cycles of charge and discharge, curve 70, and after 500 cycles of charge and discharge, curve 71. The very small amount of change occurring over this number of cycles indicates the value of the improved cell structure as disclosed herein. In the particular cell illustrated the charge and discharge current for all cycles were 0.10 amperes and 0.23 amperes, respectively.

I claim:
1. An improved electrochemical cell having a plurality of anodes, cathodes, electrolyte reservoirs, separators, gas flow spaces, and an electrolyte, in a sealed gas containing enclosure with the anodes electrically connected to a negative terminal and the cathodes con- nected to a positive terminal, the said improvement comprising:
  a. a plurality of circular disc anodes having opposing faces;
  b. a plurality of circular disc cathodes having opposing faces;
  c. a plurality of circular disc electrolyte reservoirs;
  d. a plurality of semicircular half-disc separators having opposing faces;
  e. a plurality of semicircular half-disc gas flow spaces having opposing faces;
  f. means for pairing and positioning each of the said plurality of semicircular separators and the said semicircular gas flow spaces in one-to-one relationship to provide a plurality of circular disc separator-flow space elements;
  g. means for stacking the said circular elements in the consecutive repetitive order of anode, separator-flow space, cathode, separator-flow space, and repeat, the said stack having an anode at the top and bottom of the stack, and the elements arranged such that approximately one-half of each of the said faces of each cathode is adjacent to a separator face and the other half of each of the said cathode faces is adjacent to a gas flow space such that the area of each cathode face adjacent to the said separator face is opposite (through the cathode) the area of the said cathode face which is adjacent to the said gas flow space face, and approximately one-half of each of the said faces of each anode is positioned adjacent to a said separator face and the other half of each of the said anode faces is adjacent to a said gas flow face, such that each said separator has an adjacent anode face and an adjacent cathode face opposite each other across the separator;
  h. means for positioning the said electrolyte reservoirs at the top and bottom ends of the said stack adjacent the said anodes; and
  i. an electrolyte entrainment barrier comprising a porous hydrophabic plastic membrane enclosing and contacting said stack.

2. The electrochemical cell as claimed in claim 1 wherein the said cell is a metal-metal cell.

3. The electrochemical cell as claimed in claim 1 wherein the said cell is a metal-gas cell.

4. The electrochemical cell as claimed in claim 3 wherein the said metal-gas cell is a nickel-hydrogen cell.

* * * * *